United States Patent

[11] 3,593,291

| [72] | Inventor | Glester S. Carter<br>Boulder, Colo. |
|---|---|---|
| [21] | Appl. No. | 793,694 |
| [22] | Filed | Jan. 24, 1969 |
| [45] | Patented | July 13, 1971 |
| [73] | Assignee | Thomas W. Sullivan<br>Boulder, Colo.<br>a part interest |

[54] AUTOMATIC IDENTIFICATION SYSTEM AND METHOD
16 Claims, 6 Drawing Figs.

| [52] | U.S. Cl. | 340/149, 235/61.7 B |
|---|---|---|
| [51] | Int. Cl. | G06k 7/00, H01h 43/08, H04g 3/00 |
| [50] | Field of Search | 340/149 A; 235/61.11, 61.7, 61.9 |

[56] References Cited
UNITED STATES PATENTS

| 3,009,636 | 11/1961 | Rumble | 340/149 X |
| 3,015,087 | 12/1961 | O'Gorman | 340/149 |
| 3,239,815 | 3/1966 | Martens | 340/149 |
| 3,419,881 | 12/1968 | Yamamoto et al. | 340/149 X |
| 3,513,298 | 5/1970 | Riddle et al. | 340/149 X |

*Primary Examiner* — Donald J. Yusko
*Attorney* — John E. Reilly

ABSTRACT: An identification system has separate identity devices each with prearranged but physically dissimilar patterns of readable indicia presented concurrently to identify the bearer of the devices, such as, coded credit cards and the like. The identification is made by successively reading either one or a combination of discrete areas on each card in a logical order to check for the presence of predetermined, logically related, like information characters on the cards by a reading mechanism. The identification may be made for a variety of physical locations for the readable indicia on the cards, and a positive readout is developed to indicate whether or not the information characters on one card logically corresponds with the characters on the other card.

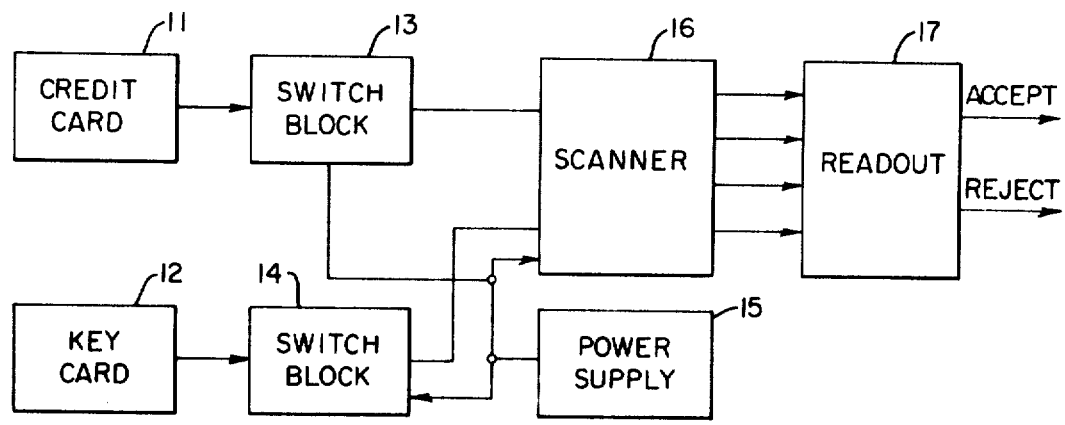
FIG. 1
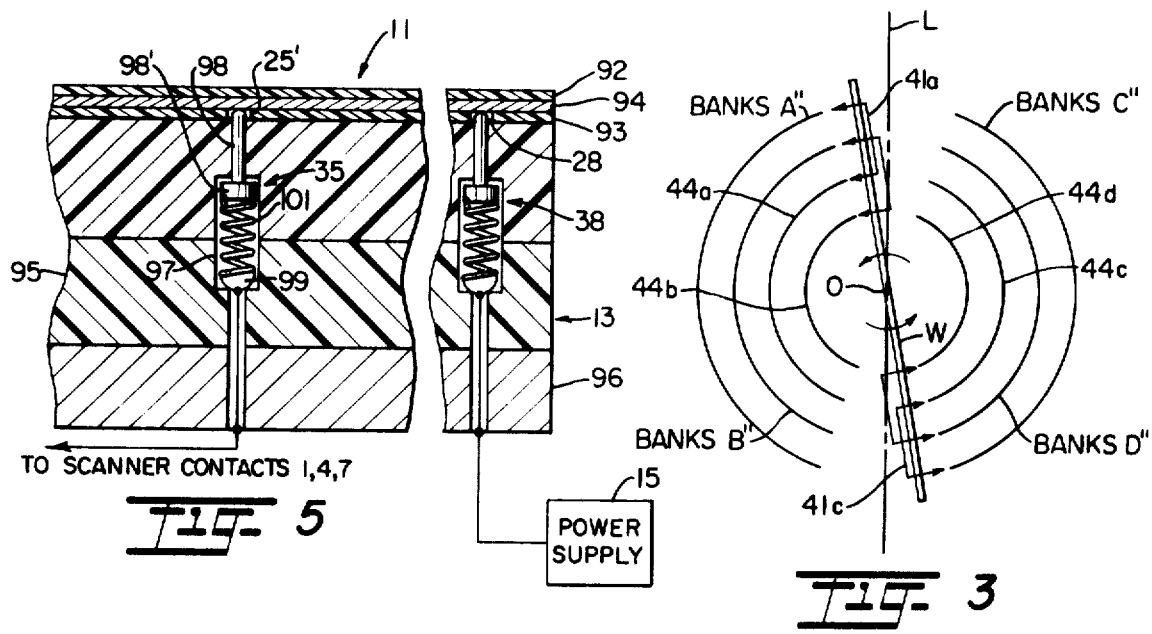
FIG. 5
FIG. 3
INVENTOR.
GLESTER S. CARTER
BY
John E. Reilly
ATTORNEY

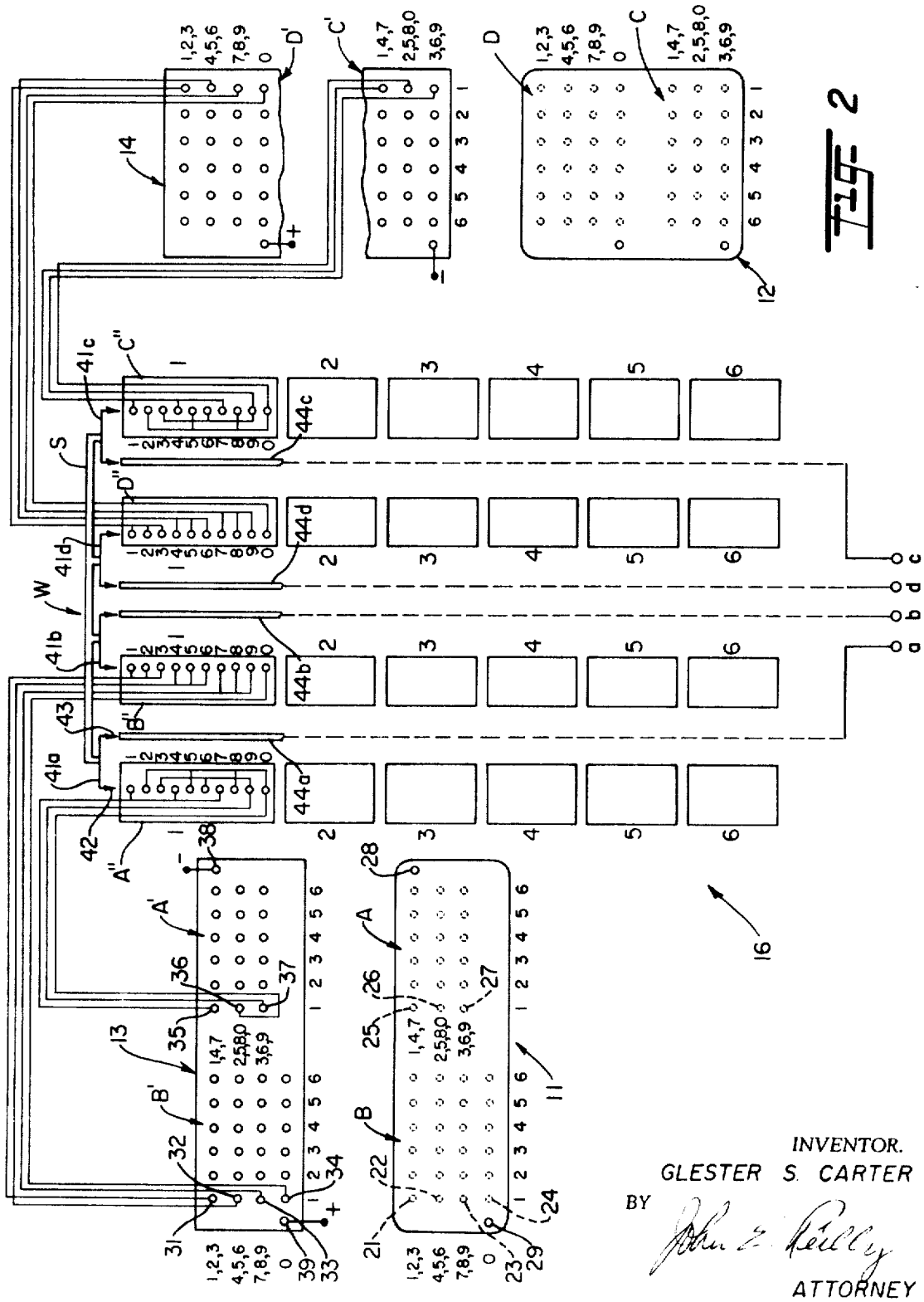

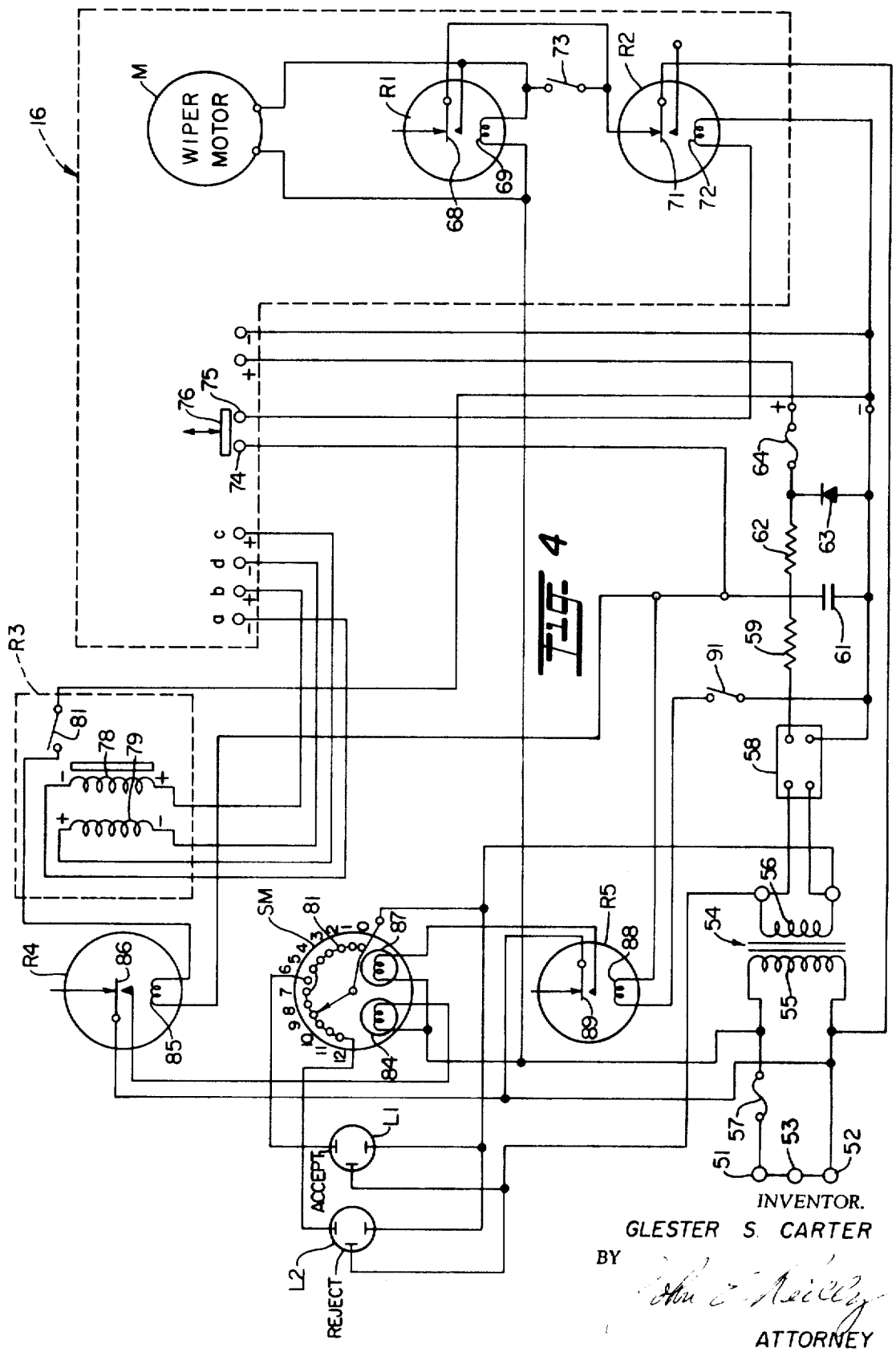

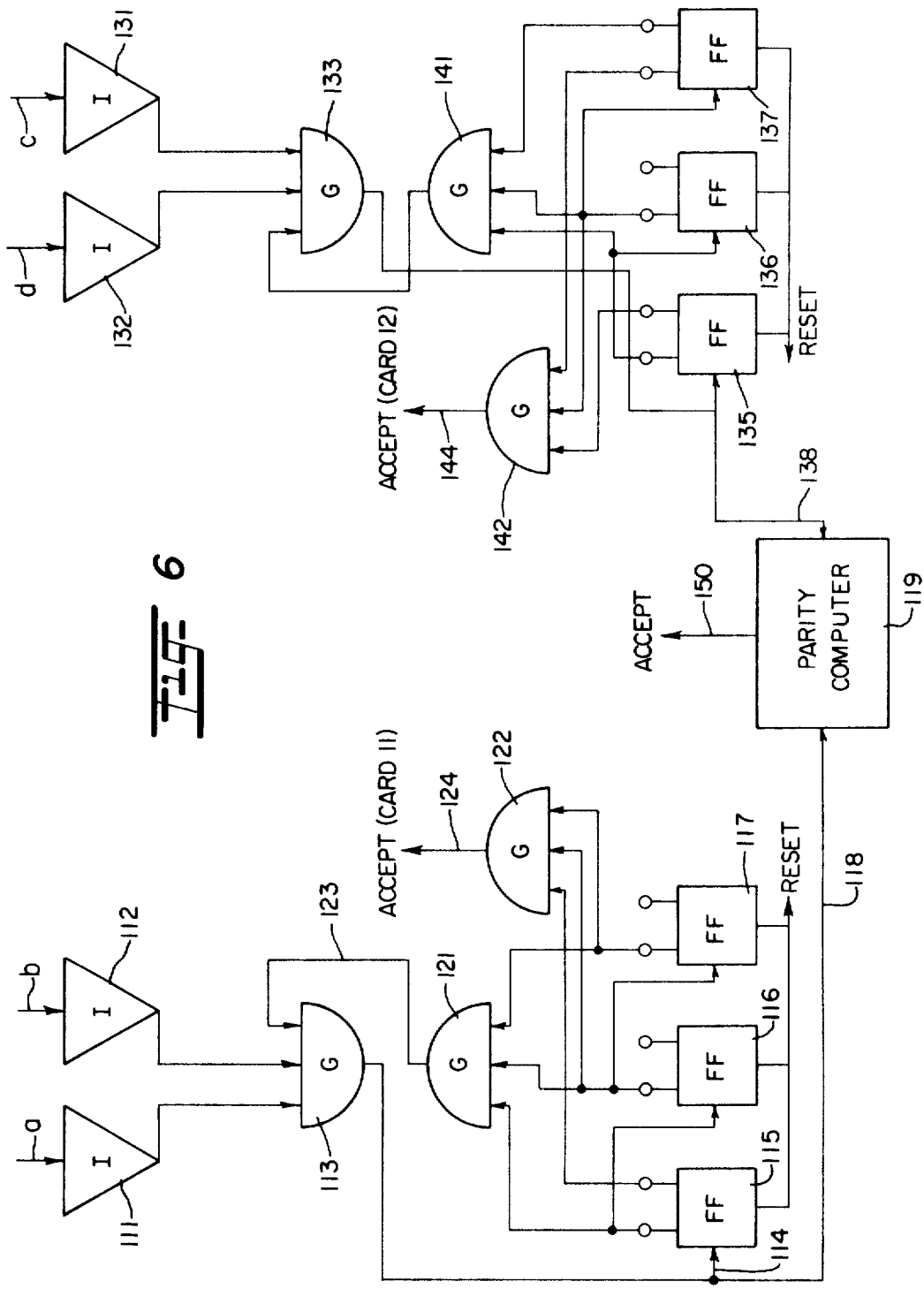

3,593,291

1

AUTOMATIC IDENTIFICATION SYSTEM AND METHOD

This invention relates to a novel and improved system and method for identifying a holder of a coded credit card and the like.

Present merchandising practices have been making widespread use of credit cards as a means for short term credit in place of cash for over-the-counter purchases. Credit cards have distinct advantages because of their size and ease of presentation for purchasers, but have the disadvantage of being used by unauthorized persons are are easily lost. Their simplicity of construction makes them a target for counterfeiting practices. Presently, credit cards do not serve to verify the identity of the holder of the credit card in a foolproof manner. Recognizing the simplicity and ease of presentation of credit cards for over-the-counter purchases it is apparent that any attempts to check or verify the identity of the holder must not materially interfere with the present over-the-counter purchases.

Accordingly, it is an object of this invention to provide a simple, reliable and foolproof identification system for positively identifying the bearer of a credit card and the like.

Another object of this invention is to provide a novel and improved system for identifying the bearer of a credit card which is readily and easily varied and conveniently adapted to present credit card construction and present commercial practices.

Yet another object of this invention is to provide a method and system for coding separate identification devices carried on the person seeking credit which has a large number of possible combinations and is extremely difficult or impossible to duplicate with only one card available.

Still another object of this invention is to provide a simple and reliable system for simultaneously checking two separate coded information sources such as a coded credit card and a coded key card bearing physically unrelated arrangements of coded indicia to be carried by the person for credit card holder identification purposes.

Yet a further object of this invention is to provide an identification system which may be used in conjunction with available equipment and particularly the telephone system and remote computers storing additional information about the holder of the card such as the financial status of the bearer and the like.

Briefly, in accordance with the present invention I provide separate coded identify devices to be carried by the purchaser, one being a credit card and the other a key card, and both must be presented at a checking station for identification of the purchaser. Apparatus which can be suitably arranged for over-the-counter transactions reads the coded indicia on the cards and compares it in a predetermined logical order to determine whether the coded indicia on both cards logically corresponds with one another. If the coded indicia logically corresponds a readout device provides a positive indication that it is acceptable. A preferred decimal number system is used and the apparatus produces binary type electric outputs suitable for use by the telephone system and by conventional computers.

Other objects, advantages and capabilities of the present invention will be more apparent as the description proceeds taken in conjunction with the accompanying drawings, in which:

FIG. 1 is a block diagram generally illustrating an identification system embodying features of the present invention.

FIG. 2 is a diagrammatic representation of more detail of a portion of the system shown in FIG. 1 including a credit card and key card with associated switch blocks and a straight line representation of a scanner and its electrical connections with the terminals of the switch blocks.

FIG. 3 is a generally diagrammatic illustration of the circular pattern as arranged for the banks of contacts and wiper assembly of the scanner.

2

FIG. 4 is a schematic diagram of more detail of electric circuitry including a power supply, motor drive and an electromagnetic readout of the system of FIG. 1.

FIG. 5 is a fragmentary vertical section of one switch block having the credit card located in an operative association and their relation to the power supply; and FIG. 6 is a schematic diagram of a logic readout circuit.

Referring now to the drawings, the block diagram representation in FIG. 1 shows the coded information as being provided by separate identification devices or sources herein illustrated as a coded credit card 11 and a coded key card 12 normally carried by a person as are present day credit cards. The checking station for the cards may be located at a store counter or the like and comprises a switch block 13 for card 11 and a separate switch block 14 for card 12 together with a power supply 15, said switch blocks functioning to support the card in position and selectively switch in electric power from the power supply to in effect change the particular readable indicia on the cards to a corresponding electrical signal form. There is also provided a scanner circuit 16 interconnected with the switch blocks which reads the electric coded signals developed from both cards and simultaneously checks or collates for logically corresponding coded information on the same card and for logically corresponding information on both cards and a readout circuit 17 develops an "accept" output if information corresponds and a "reject" output if the information does not correspond.

Referring now to FIG. 2 for more details a preferred embodiment illustrated employs a decimal number character system with a six-digit decimal number being shown as a typical example in the drawings for explanation purposes. The electric interconnections between the various parts of the system shown for one digit of the decimal number is illustrated in detail in FIG. 2 for the first number or one digit with the remainder of the apparatus shown in block form and related by common numerals for clarity since the specific connections repeat for each consecutive digit, each consecutive digit being referred to consecutively by numerals 1-6 associated with the various parts, connections and blocks.

Credit card 11 has two information portions on areas A and B and the key card 12 has two information portions or areas C and D. It is noted that in the example shown information area A generally corresponds to information area C and information area B generally corresponds to area D and their arrangement on their respective cards differ in that the two areas of cards 11 are arranged side by side while on card 12 the two information area are stacked one above the other as a simple illustration of the different physical locations for like information.

The information areas are coded or marked with readable indicia. Generally the code consists of the pattern or arrangement of readable indicia or marks which are made and withheld from distinct locations on the card but in practice coded information is arranged differently on each card and matched in a logical order in the scanner to be described so that the manner of coding each card cannot be duplicated by examining one card.

The order of applying the readable indicia to these information areas A, B, C and D for the decimal number system illustrated is similar in sequence for both cards for clarity of explanation and with specific reference to card 11 comprises a pattern of four possible readable markings in the form of small discrete areas on the card represented as dashed circles on the card arranged in a column and designated from top to bottom with numerals 21, 22, 23, and 24 in area B and three possible readable indicia in a column designated from top to bottom with numerals 25, 26 and 27 in area A. The arrangement in columns is for clarity of explanation, it being apparent from the following description that they may be and preferably are located at random on the card, and differently for each card. These two columns of seven possible readable markings 21— 27 are for one digit of the six-digit number with the six columns for each area being numbered consecutively 1 through 6 for the six-digit number. This affords a total of 42 readable indicia on each card to provide a large number of possible combinations. In addition, card 11 has one power input 28 marked in area A and a power input mark 29 in area B through which the electric power from the power supply 15 is transmitted to the coded readable marks on the card as described hereinafter.

The switch block 13 for card 11 has a column of four pickup terminals in area B' designated from top to bottom with numerals 31, 32, 33 and 34 and column of three pickup terminals in Area A' designated from top to bottom by numerals 35, 36, 37 and 38 which correspond to areas B and A, respectively, and their possible readable markings 21—27, respectively, on card 11 above described. In the event the location of the readable indicia on the cards change then the locations on the block are changed accordingly. An input terminal 38 corresponds with mark 28 and an input terminal 39 corresponds with mark 29. Similarly, switch block 14 has an area D' with four terminals corresponding to area D of card 12 for each digit and an area C' corresponding to area C of card 12 for each digit together with and corresponding power terminals on the block 14 and power input marks on the card 12.

The scanner 16 for reading the coded indicia on the cards in a logical order is generally illustrated in FIG. 2 as of the mechanical type and comprises four banks of contacts designated A'', B'', C'' and D'' corresponding to the four information areas A, B, C and D, respectively on the cards and associated areas on the switch blocks A', B', C' and D' above-described. Briefly stated, each card has a similar or corresponding character in each information area such as a discrete area marked for number one. The mechanical type scanner relates like characters for each information area by using matched contacts arranged adjacent to one another. For the decimal number system herein referred to this is carried out by having ten contacts in each bank arranged which are in a series and numbered consecutively from top to bottom from 1 to 0 with 0 referring to the tenth number which are related to seven terminals on each block. These banks of contacts for the two information areas are adjacent one to the another to establish ten pairs of coincident contacts for each card and for the four information areas ten sets of four coincident contacts for both cards for each digit; with six consecutive banks of contact 1—6 for each information area for a six-digit number.

A wiper assembly W of the scanner is arranged to simultaneously engage one of the sets of four coincident contacts and transfer their instantaneous electric condition by electric signal to output terminals for the scanner designated a, b, c, and d corresponding to each information area A, B, C, and D, respectively. The wiper assembly W, as illustrated somewhat schematically in FIG. 2, has four identical blades 41a, 41b, 41c, and 41d corresponding to each bank of contacts; the blades are arranged in line transversely of the consecutive banks and secured on a common structural support S which electrically insulates one from the other so that each of the four blades simultaneously engage one of the ten sets of four coincident contacts in the four adjacent banks. More specifically, blade 41a which is typical has a wiper edge 42 which is arranged to engage the contacts of bank A'' and a second wiper edge 43 electrically connected to the first wiper edge is arranged to sweep or move over a track 44a and over the contacts of bank A'' which is electrically connected to terminal a. The other blades have similar wiper edges and tracks designated 44b, 44c, and 44d to associated output terminals , c and d, respectively. The wiper assembly W is driven by a suitable drive such as an electric motor hereafter described more fully to move the blades along and successively in engagement with one set of four coincident contacts. Thus, for example the electric condition at contact 1 for the four banks from all four information areas A, B, C and D simultaneously appears at terminals a, b, c and d in the scanning operation; the additional banks designated by numerals 2—6 for the consecutive digits of the six-digit number being contacted like the number 1 bank for each information area.

In carrying out the reading of the coded information utilized location and arrangement of the readable indicia markings on the cards which corresponds with the terminals on the associated switch block, together with the connections between the block terminals and the scanner contacts, are relates so that for the same character number on each information area of both cards there is only one match or one set of four coincident contacts. A match of pairs of contacts corresponding to the same number for either card will connect a voltage from the power supply through the scanner; the voltage being utilized by the readout circuit. In one complete sweep of the number one group of banks A'', B'', C'' and D'' this will occur if the same coded numbers are present on both areas of both cards. Two DC output voltages will be present at the same time across terminals a and b and terminals c and d from the power supply only once thereby developing a check or collation for corresponding characters.

The connections between the switch blocks 13 and 14 and the associated banks of contacts are the same for both cards so that a description of one applies to both. The first terminal 31 of switch block 13 in connected to each of the first group of three contacts of bank B''. The next terminal 32 is connected to each of the second group of three contacts of bank B''. The third terminal 33 is connected to the third group of three contacts of bank B'' and the fourth terminal 34 is connected to the last contact of bank B''. Switch 13 has its fifth terminal 35 connected to each of the first, fourth and seventh contacts of bank A''. The sixth terminal 36 is connected to each of the second, fifth, eighth, and tenth contacts of bank A'' and the seventh terminal 37 is connected to each of the third, sixth and ninth contacts of bank A''.

This above-described arrangement for one card will read or check to see if any the b one to ten is present on the two information areas of the card. For example, if the discrete area or circle corresponding to number 1 were marked at 21 in area B and the circle corresponding to number 1 marked at 25 in area A the credit card were placed in an operative position on its switch block, the blades of the wiper assembly W moving over the number one pair of contacts of the first bank will have a voltage produced across terminals A and B only once in a full sweep of the banks A'' and B'' indicating therefore the presence of the same number on both information areas of the same card for one scan. A corresponding number 1 marked in the appropriate circles in areas C and D of card 12 in the same manner will apply electric voltage from the power supply to coincident contacts of banks C'' and D'' to provide a voltage across terminals c and d at the same time it appears across terminals a and b thereby reading the number one on all four areas of the two cards.

While the arrangement of the successive banks of contacts for each additional digit is shown in FIG. 2 as a straight line pattern with the wiper assembly W being moved along a linear path for clarity of illustration and explanation, a curvilinear or arcuate pattern for the contacts and tracks such as illustrated schematically in FIG. 3 will permit the wiper assembly W to rotate about a central axis 0 using a rotary drive motor hereinafter described. An arcuate pattern for banks A'' and C'' is depicted in FIG. 3 as a curved line or arc along the same radius from axis 0 on opposite sides of a center line L and similarly an arcuate pattern for banks B'' and D'' is along the same radius which is a shorter radius than that of the two other banks and banks B'' and D'' also are on opposite sides of line L and B'' inside A'' and D'' being inside C''. Tracks 44a, 44b and 44c as well as tracks 44b and 44 d are arranged along an arcuate portion on a yet shorter radius inside the associated outer contact patterns on opposite sides of the center line corresponding to their banks so that the wiper blades will engage the tracks in contact on the banks of contacts in the same manner in sequence as above described with reference to FIG. 2. This circular symmetrical arrangement has the wiper blades changing sides for each 180° of rotation of the motor; that is it changes from one side of the center line L to the other side. Thus a rotary motor suitably coupled to the midpoint of the wiper assembly W being rotated about axis 0 in a counterclockwise direction as viewed in FIG. 4 will serve to read the sets of four contacts of the consecutive banks.

Referring now to FIG. 4 a suitable power supply for the specific electric circuits hereafter described comprises input terminals 51 and 52 which are connected to a suitable AC source 53 by a plug connection or the like, a stepdown transformer 54 having a primary winding 55 and a secondary winding 56. A fuse 57 is located in the 108 line of the primary winding for overload protection purposes. A rectifier 58 is connected across the secondary winding 56 to convert from AC to DC power. The output of the rectifier 58 is filtered by an RC network comprising a resistor 59 and a capacitor 61 and the DC voltage from the filter is decreased or lowered by a resistor 62 and a diode connected beyond the filter 63. Diode 63 holds the DC voltage from the scanner control hereinafter described at a fixed level. A fuse 64 is connected beyond the resistor 62 which in essence functions as a foolproof device which will be activated in the event any attempt is made to short power from the input to all of the switch block terminals such as by simply placing a copper plate over the switch block.

A wiper drive for the wiper assembly W shown schematically in FIG. 4 includes an electric motor M which is in a driving relation to the wiper assembly W together with a control circuit for selectively stopping and starting the motor M. This control circuit has a relay R1 having contacts 68 and a coil 69 and a relay R2 having contacts 71 and a coil 72. The electric power at the primary side of the transformer of the power supply above described is connected to the terminals of motor M through contacts 68 and contact 71 to activate motor M when the contacts are closed. The coil 69 is initially energized upon the closure of a switch 73 to close contacts 68; switch 73 being in a series circuit with the contacts 71 and the power supply. Contacts 68 are in 139 138 switch 73 to bypass this switch when closed. Coil 72 is connected to a DC voltage output of the power supply in a circuit including two terminals 74 and 75 in the scanner and is normally energized when the motor M is running. An armature or contact 76 responsive to the rotary position of the wiper assembly W shorts across terminals 74 and 75 upon the completion of a full scan of all of the consecutive banks of contacts which is about 180° in the arrangement of FIG. 4. Armature 76 is activated by the movement of the wiper assembly W after the completion of half of a revolution. The energization of coil 72 opens contacts 71 to open the power circuit to the motor M and stop the motor. The motor is again started by closing switch 73 to again close contacts 68 as above described.

The readout stage 17 as shown schematically as a block in FIG. 1 may take a variety of forms with an electromagnetic readout circuit being shown in FIG. 4 and a logic circuit being shown in FIG. 6. Generally, the function of each readout circuit is to develop a positive "accept" indication or output when information on the same card and the information on both cards corresponds in all respects and a "reject" indication or output when it does not correspond in response to the outputs of the scanner stage 16. The electromagnetic readout circuit of FIG. 4 comprises a comparator relay R3 having a coil 78 connected across output terminal $a$ and $b$ and a coil 79 connected across output terminals $c$ and $d$ of the scanner 16. The equivalent electric circuit for the coils of relay R3 is two coils connected in parallel across a DC battery through the contacts of the scanner. The coils 78 and 79 are bifilar wound having the same DC resistance in both coils to provide an absolute balance between and they inductively add to each other so that when a DC voltage from the power supply is present across terminals $a$ and $b$ and also terminals $c$ and $d$ a contact 81 of the relay will close. The condition of having a voltage across only one of these coils is not sufficient to activate contact 81 but both must be activated simultaneously.

A stepper motor SM has a series of contacts 82 numbered consecutively from 1 through 12 and a wiper 83 which moves over the contacts together with a drive coil 84 for advancing the wiper one step to the next contact each time coil 84 is energized. A relay R4 having a coil 85 and contacts 86 couples the comparator relay R3 to the stepper motor SM so that upon closing of contact 81 of relay R3 the coil 85 is energized and contacts 86 are closed thereby connected the power from the power supply to the forward coil 84 to step the wiper 83 once. An "accept" indicator light L1 is connected to contact 6 and a "reject" indicator L2 is connected to all of the other contacts 1—5 and 7—12 of the stepper motor; the number 6 corresponding to the number of consecutive banks of contacts for each information area of the card. In the event the wiper assembly W has scanned all six consecutive banks of contact A", B", C" and D" and all of the numbers of the six decimal digits on each portion of the same card correspond and the number on both cards correspond, the wiper 82 will stop on contact 6 and the "accept" light L1 will go on indicating that the credit card is acceptable. If however the wiper 83 steps less than six contacts or more than six contacts on the stepper motor, the "reject" light will go on indicating that the credit card is rejected. The stepper motor SM also has a return coil 87 which upon energization by the power source will return the wiper 83 to a zero or neutral position. A relay R5 having a coil 88 and contacts 89 together with a reset switch 91 are connected in a circuit with the power supply and the return coil 87 so that upon closing the switch 91 the relay coil 88 is energized to close the contacts 89 and connect the power supply to the reverse coil 87 to return the wiper 83 to its neutral position. Switch 91 is closed after each checking operation.

A preferred form of credit card and key card structure and associated switch block structure for that generally described with reference to FIG. 2 is illustrated in more detail in FIG. 5 reference being made to card 11 and its associated block 13 for explanation purposes; it being understood that both the key card 12 and its block 14 may be of identical construction. Credit card 11 is preferably comparable in size and shape to available credit cards. As shown in FIG. 5 the card is of a laminated or sandwich construction with thin outer layers 92 and 93 composed of plastic or the like electric insulating material and a thin inner layer 94 sandwiched between the outer layers which is composed of an electric conductive material such as copper. The switch block 13 as shown in FIG. 5 comprises a body or base 95 preferably formed of two layers of material which overlay a board 96; the latter may be a printed circuit board containing the contacts of the scanner and other electric circuits. Base 95 is of a similar shape to that of the card and supports the coded card which is disposed on its top surface in the checking operation. The base 95 is provided with suitable holddown mechanism, (not shown) to clamp the card in place firmly on the top surface of the base 95.

Relating the card 11 and block 13 of FIG. 2 to the sectional view of FIG. 5 a code mark 25' corresponding to the dashed circle 25 of FIG. 2 and the power input mark 28 of area A are shown in FIG. 5 as recesses through layer 93 into the copper layer 94. The input terminal 38 and output terminal 35 of area A' of block 13 corresponding to these marks on the card are selected for purpose of explanation it being understood that all other terminals in the block in the form shown may be of similar construction. The input terminal 38 and output terminal 35 of the block area are of identical construction and comprise internal housing 97 which contains and supports a flanged pin 98 extending upwardly through and above the top of the block 95 with its upper limit being set by a head portion 98' arranged to bear against the top wall of the housing when the card is removed together with a lower cup 99 seated on the bottom wall of the housing and a tension spring 101 held between the head portion 98' and the cup 101 so as to force the pin through the top of the block and into the recesses in the card and thereby make electrical contact with the conductive layer 94. The three elements 98, 99 and 101 are all composed of an electric conductive material and are electrically connected together at all times so as to pass electric current therethrough. It is therefore apparent that when the card is in position on the block as with the recesses representing code marks being made at a particular location on the card and the pins of the terminals 35 and 38 fitting in the recesses and being forced against the copper plate by the spring the card functions like a contact of an electric switch and electric power will be transferred from the power supply 15 through the input terminal 38 through the copper plate 94 through terminal 35 and from terminal 35 to selected of the scanner contacts. The lower boards 96 may be a printed circuit board containing the scanner contacts.

The logic readout circuit for use in conjunction with the scanner 16 above-described in general comprises three identical logic circuits which will be explained in detail with reference to the one for credit card 11 and the output terminals *a* and *b* of the scanner circuit. The outputs from the terminals *a* and *b* are inputs to inverters 111 and 112, respectively, which in turn develop separate outputs delivered into a gate 113. The output of gate 113 is applied over line 114 as an input to a counter composed of three cascaded flip-flop circuits 115, 116, and 117, and also develops an input over line 118 to a parity computer 119. The output from each of the flip-flop circuits is applied over separate lines as separate inputs to a feedback gate 121 and also as separate inputs to an output gate 122. The output of the feedback gate 121 is applied as an input over line 123 to gate 113 and functions to inhibit or turn off gate 113 if more than six count signals are produced by the counter for the six decimal number being referred to herein. This inhibiting of gate 113 will prevent counts of multiples of six. An "accept" signal for credit card 11 will appear at the output of gate 122 over line 124.

The logic circuit for the key card 12 is identical to that of the above-described logic circuit for the credit card with output terminals *d* and *c* providing an input to inverters 131 and 132, respectively together with a gate 133 beyond the inverters and a counter stage including cascaded flip-flops 135 and 136 and 137; the feedback gate 141 and output gate 142 interconnected as on the credit card side. Similarly the output of gate 133 is applied as an input to the parity computer 119 over line 138 and the output gate 142 will produce an "accept" signal over line 144 of the output gate 142 if the code marks on card 12 correspond logically. The parity computer 119 is identical to either of the above-described logic circuits for either card, it receiving two inputs, producing an "accept" output over line 150 for both cards.

In sequence then as the wiper assembly W scans the contacts a common code character on each of the four information areas as above-described will produce an output from gates 113 and gates 133 and result in one count in the counting chain. In counting a six-digit number, at the sixth count a signal will be produced at the output of gate 122 and gate 142 over line 144, respectively. Should an additional coincident signal occur beyond six on either side, gates 113 or gate 133, respectively, will be turned off thus preventing any further counting.

Thus the complete logic circuit shown has three "accept" signals which will be produced over lines 124, 144 and 150 when six and only six paired inputs exist from the credit card and the key card and these pairs are matched to each other. The signal levels over lines 124, 144 and 150 are sufficient for a reed relay drive or lamp to give a positive indication. The gates shown as G in the Figures are either a NAND or NOR gate used in the NAND mode only.

Although the present invention has been described with a certain degree of particularity, it is understood that the present disclosure has been made only by way of example and that changes in details of structure and system components may be made without departing from the spirit thereof.

What I claim is:

1. In an identification system, the combination comprising:
   a pair of identity devices having corresponding codes on each other as well as corresponding codes on both cards, said corresponding codes being arranged in a different physical order and related in the same logical order,
   reading means for simultaneously scanning both devices to simultaneously collate for corresponding codes of each device and both devices and to collate for noncorresponding codes on each device and both devices, and
   means responsive to said reading means for developing an indication when the corresponding codes and noncorresponding codes are present.

2. In an identification system as set forth in claim 1 wherein said identity devices are a coded credit card and a coded key card to be presented concurrently to identify the bearer.

3. In an identification system as set forth in claim 1 wherein said reading means develops a binary output representing the presence of predetermined corresponding codes on the cards.

4. In an identification system, the combination comprising:
   a pair of identity devices being separately coded with readable indicia at preselected of a plurality of small discrete areas of the devices, each said identity device having readable indicia which corresponds with each other as well as readable indicia which corresponds with one another,
   pickup means for each device having a plurality of pickup terminals adapted to engage said small discrete areas to sense the presence and absence of readable indicia thereon,
   scanner means arranged for relating the terminals on each card to each other in a logical order independently of their location on said pickup means to establish a plurality of logically related, like information characters for both devices and for scanning the related terminals to simultaneously collate for corresponding codes on each device and both devices for the presence and absence of said logically related characters prearranged on the devices as readable indicia on said identity devices, and
   means for developing a separate indication when said like characters are present and a separate indication when said like characters are absent on said devices.

5. In an identification system as set forth in claim 4 wherein said like information characters are established by matching a terminal of one block with another terminal on the one block and a terminal of the other block with another terminal of the other block and matching the terminals of both blocks.

6. In an identification system, the combination comprising:
   a pair of separate identity devices coded with readable indicia at preselected of a plurality of small discrete areas on the device,
   a switch block for each having a plurality of pickup terminals positioned to engage said small discrete areas to sense the presence and absence of readable indicia thereon,
   reading means having banks of matched contacts, each contact connected to preselected of the pickup terminals on each card to each other and on both cards to one another in a logical order independently of their location on the blocks to establish a plurality of logically related like information characters for each device and both devices and motor driven wiper means for dynamically scanning the matched contacts to simultaneously collate both devices for the presence and absence of said like characters being precoded as readable indicia on said devices, and
   readout means coupled to the wiper means including a counter for counting the number of matched contacts for each scan of the wiper means over each bank of contacts and all banks of contacts and indicator means for developing an indication when the logically related like characters are present and absent on said devices.

7. In an identification system as set forth in claim 6 wherein said readout means includes an electromagnetic circuit including a relay having a coil each card, said relay being engaged to close when simultaneous outputs are present from simultaneously reading each and both cards.

8. In an identification system as set forth in claim 6 wherein said readout means includes a stepper motor to count the number of times the simultaneous outputs are present, said motor being arranged to turn on an indicator if the motor steps a predetermined number of times and a second light if it steps less or more than the predetermined number of times.

9. In an identification system as set forth in claim 6 wherein said readout means is an electronic logic circuit including first gate means responsive to the simultaneous outputs of each card, a counter for counting the number of simultaneous outputs for each scan and a second gate means for inhibiting the first gate means when a selected number of counts is exceeded.

10. In an identification system the combination comprising:
a credit card and a key card, said cards being coded with readable indicia at preselected of a plurality of small discrete areas on the cards,
an electric power source,
a switch block for each card having at least one input terminal connected to the power source and a plurality of pickup terminals adapted to engage each of the small discrete areas and readable indicia of the cards, each said card having an electrically conductive portion for transferring electric power from said power source through the card and to the pickup terminals,
reading means for the cards including banks of matched contacts arranged side by side, each contact connected to a preselected of the pickup terminals on each card to establish a plurality of like information characters on both cards and a motor driven wiper means transferring power from the contacts to scan the related terminals simultaneously collate both cards for the presence and absence of said like characters, and
counter means for counting the number of matched contacts per scan of the wiper means over each bank of contacts and all banks of contacts, said motor automatically stopping after each complete scan, and indicator means for developing an indication when said like characters are present and absent on either of said cards after each complete scan of the contacts.

11. In an identification system according to claim 10 wherein each said card is of a laminated construction having outer electric insulator layers and an inner electric conductive layer.

12. In an identification system according to claim 10 wherein each said switch block includes a flat base adapted to support the card, each said input and pi pickup terminals including a pinlike member slidably supported in the base and urged upwardly against the card, through a selected recess in an outer layer of the card into engagement with the conductive layer to make an electrical contact therewith.

13. In an identification system, the combination comprising:
a pair of identity cards adapted to be precoded on information areas with readable indicia at a preselected of a plurality of small discrete areas on the cards, each card having a first and second information area,
a switch block for each card having a plurality of pickup terminals adapted to engage said small discrete areas to sense the presence and absence of readable indicia thereon,
reading means having a first bank of contacts for one information areas and a second bank of contacts for the other information areas of each card, said banks for both cards being arranged adjacent to one another to establish a series of sets of four of four coincident contacts,
each said switch block for each card having selected of its pickup terminals connected to selected of contacts of the first bank and other selected of its pickup terminals connected to selected of its contacts to the second bank independently of their location on the blocks to match terminals representing logically related like characters as coincident contact pairs only once in the first and second contact banks for both cards,
said reading means having a motor driven wiper assembly sequentially engaging the sets of coincident pairs of the banks to collate for the presence and absence of logically related like characters being precoded as readable indicia on said cards, and
stepper motor means for counting each set of energized coincident pairs and indicator means coupled to the stepper motor means for developing an indication when the like characters are present and absent on said cards.

14. In an identification system according to claim 13 wherein said characters are decimal numbers from one to ten with ten contacts in each bank being assigned consecutive numbers, each said bank being logically related to seven pickup terminals on the switch block and representing one digit.

15. In an identification system according to claim 13 wherein the banks of contacts and terminals are consecutively repeated for consecutive digits.

16. In an identification system according to claim 13 wherein there are six pairs of banks of contacts for each information area on the cards to provide 42 pickup terminals on each switch block.